(12) United States Patent
Flom (10) Patent No.: US 6,830,145 B2
(45) Date of Patent: Dec. 14, 2004

(54) SYSTEM FOR USE IN AN ASSEMBLY LINE (75) Inventor: H. Douglas Flom, New Richmond, WI (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 10/641,244

(22) Filed: Aug. 14, 2003

(65) Prior Publication Data
US 2004/0050664 A1 Mar. 18, 2004

Related U.S. Application Data (62) Division of application No. 10/047,230, filed on Jan. 14, 2002, now Pat. No. 6,612,418.

(51) Int. Cl.[7] .............................................. B65G 47/00
(52) U.S. Cl. ..................................... 198/617; 198/460.1
(58) Field of Search ............................. 198/617, 347.1, 198/459.1, 460.1, 461.1

(56) References Cited

U.S. PATENT DOCUMENTS

| 2,745,410 A | | 5/1956 | Molins |
| 3,621,975 A | * | 11/1971 | Vilen ...................... 198/460.1 |
| 3,789,286 A | | 1/1974 | Towne et al. |
| 3,865,254 A | | 2/1975 | Johannsmeier |
| 3,968,626 A | | 7/1976 | Hobbs |
| 4,293,249 A | | 10/1981 | Whelan |
| 4,604,704 A | | 8/1986 | Eaves et al. |
| 4,903,713 A | | 2/1990 | Clarke |
| 4,938,657 A | | 7/1990 | Benson et al. |
| 5,501,552 A | | 3/1996 | Simkowski |
| 5,711,410 A | * | 1/1998 | Cai et al. ................. 198/460.1 |
| 5,738,202 A | * | 4/1998 | Ydoate et al. ........... 198/460.1 |
| 5,979,636 A | * | 11/1999 | Vanacore et al. ........ 198/460.1 |
| 6,076,683 A | * | 6/2000 | Okada et al. ............... 209/656 |
| 6,370,447 B1 | * | 4/2002 | Miyazaki ................... 700/230 |
| 6,398,461 B1 | | 6/2002 | Vincent et al. |
| 6,612,418 B2 | * | 9/2003 | Flom ....................... 198/460.1 |
| 6,690,995 B2 | * | 2/2004 | Prutu ........................ 700/228 |
| 6,705,453 B2 | * | 3/2004 | Blumenthal et al. ..... 198/471.1 |
| 6,729,463 B2 | * | 5/2004 | Pfeiffer .................... 198/460.1 |
| 6,763,931 B1 | * | 7/2004 | Brehm ..................... 198/460.1 |

* cited by examiner

Primary Examiner—Douglas Hess
(74) Attorney, Agent, or Firm—John A. O'Toole; Douglas J. Taylor (57) ABSTRACT A transfer system comprised of an air conveyor, a servo conveyor, and a fan feeder. In a typical configuration, the air conveyor is located at a first location where it receives packaged articles from a bagger system or a conveyor system. The servo conveyor abuts the air conveyor and extends to a second location adjacent to a destination point. The fan feeder is located adjacent to the servo conveyor at an end opposite the air conveyor. The fan feeder lies over a bucket conveyor for a cartoner system.

8 Claims, 10 Drawing Sheets

SYSTEM FOR USE IN AN ASSEMBLY LINE

CROSS-REFERENCE TO RELATED APPLICATIONS

The present application represents a division of U.S. Ser. No. 10/047,230 filed Jan. 14, 2002, now U.S. Pat. No. 6,612,418.

TECHNICAL FILED

The present invention relates generally to a conveyor system for transporting items. More specifically, the present invention relates to a transfer system for rapidly transporting articles between non-synchronous elements of an assembly line.

BACKGROUND

Conveyance systems for transporting articles through an assembly, processing or packaging line are common. These conveyance systems are typically comprised of a number of different elements each working in cooperation with the other to accomplish a particular task. For many such systems, every inline element must work synchronously with each other in order for the entire system to work properly.

While these conveyance systems generally work for their intended purposes, the dependence of these systems on the synchronized performance of each element hinder their reliability, increase their cost, and make maintaining and updating these systems quite difficult. A break down in any inline element typically necessitates stopping the entire line while the broken element is repaired or replaced. Adding or replacing additional elements to a system will also typically require stopping the entire line, and in addition, will also typically require the resynchronization of the entire system. During these down periods, the entire line is shut and no products are produced.

Current systems are also typically obtrusive structures that impart a large footprint on the factory floor. This is due in part to their many redundant elements and also largely due to the length of the conveyors which communicate with every element within a system. Floor space in a factory is usually limited, so minimizing the footprint of a conveyance system provides a significant benefit. Furthermore, reducing some of the redundancies of these systems will also typically reduce the cost of such systems.

Figure 1:
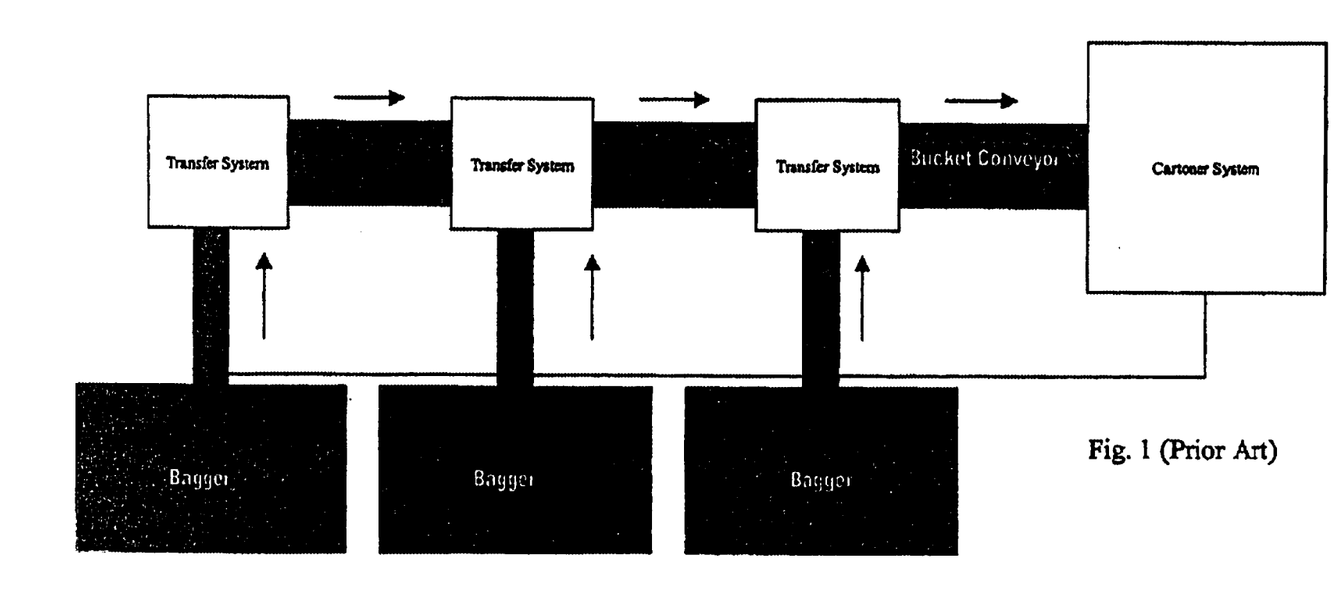
FIG. 1 is a schematic view of a prior art conveyor system for cereal packages.

FIG. 1 shows a known configuration of a conveyance system adapted particularly for the conveyance of a packaged article to a cartoner system. This configuration will typically include one or more bagger systems, a transfer system for each bagger system, and a cartoner system. The bagger system produces a packaged article and transports it to the transfer system. The transfer system then feeds the packaged article to the cartoner system.

The bagger system is usually comprised of a bagger and a incline conveyor. Each bagger receives a product in loose form, places it in a bag, and then seals the bag. Once sealed, the packaged article is deposited onto the incline conveyor for transport.

The packaged article is then transported via the incline conveyor to the transfer system. The transfer system is typically a feeder which receives an individual packaged article from the bagger and deposits it in proper orientation onto a conveyor portion of the cartoner system. Typically, each transfer system cooperates with only one bagger system, and each is synchronized with the bucket conveyor so that it can only feed certain buckets.

The cartoner system is usually comprised of a bucket conveyor and a cartoner. A drive shaft extends from the cartoner and drives movement of the bucket conveyor and incline conveyors. The drive shaft provides timing information for each bagger sequence of production. The bucket conveyor is a conveyance mechanism having a plurality of pre-defined slots, otherwise referred to as buckets. The cartoner receives a packaged article from a bucket, places the packaged article within a carton, and then seals the carton.

In operation, an entire system is controlled by the cartoner. When the cartoner is ready to receive a packaged article, it signals a particular bagger system to create one. The bagger system creates the packaged article and conveys it to the transfer system, where the transfer system feeds it into an appropriate bucket.

After it sends a signal to the bagger system, the cartoner system is timed to receive the packaged article from an appropriate bucket. Once a packaged article is received, the cartoner places it into a carton and then seals the carton.

The need for such intimate cooperation between the three systems is often inefficient and can increase the costs for producing a packaged article. Occasionally a cartoner or a transfer may need repair, or may need a refill of carton material, or may need to be replaced. During these periods, the degree of cooperation between the elements will typically require that the entire system be stopped until the repair or replacement is completed. This inefficiency can substantially limit the productivity of the line.

Consequently, there is a need for a transfer system that is able to bridge between two elements such as the bagger and the cartoner and allow both elements to work independently of the other.

There is also a need for a transfer system that can quickly and easily adjust to any increase or decrease in the number of articles it transports.

There is also a further need for a transfer system that requires a minimum amount of floor space.

Furthermore, a transfer system is needed that eliminates unnecessary redundant elements and that can be produced at a lower cost than similar systems.

BRIEF SUMMARY OF THE INVENTION

The subject invention is a high speed transfer system capable of transferring articles between two nonsynchronized elements, enabling both elements to work largely independent of the other. One embodiment of the transfer system is generally comprised of an air conveyor, a servo conveyor, and a fan feeder. In a typical configuration, the air conveyor is located at a first location where it receives packaged articles from a bagger system or a conveyor system. The servo conveyor abuts the air conveyor and extends to a second location adjacent to a destination point. The fan feeder is located adjacent to the servo conveyor at an end opposite the air conveyor. The fan feeder lies directly over the destination point for the article. The destination point is typically a bucket conveyor for a cartoner system.

In one embodiment, the air conveyor includes a frame which supports a plenum that is disposed longitudinally and angularly across the frame. The plenum has an open end with a grated cover that extends longitudinally across the open end. The openings in the cover allows air from the plenum to pass therethrough. The plenum also has a closed end which has at least one opening adapted to interface with an air source.

In one embodiment, the servo conveyor includes three separate conveyor mechanisms. Each of the conveyor mechanisms operates independently of the others, allowing all three conveyor mechanisms to operate at different speeds. The speed of the each conveyor mechanism is controlled by a controller.

In one embodiment, the fan feeder includes a housing, a pair of motors disposed within the housing, and a rotor coupled to each motor. Each rotor has a plurality of blades which extend outwardly over the bucket conveyor and cooperate with each other to support, orientate and guide a packaged article to a bucket lying beneath the blades.

In operation, the high speed transfer system is able to rapidly transfer packaged articles between a bagger system and a cartoner system without having the two systems work in synchronization. This is achieved in part by the capability of the subject transfer system to hold onto a packaged article until one is required by the cartoner. This is also achieved in part by the ability of the subject transfer system to rapidly deliver a packaged article to a cartoner.

A packaged article is received by the air conveyor and is then held there until transferred to the servo conveyor. As a bucket approaches the fan feeder, the packaged article is transferred to the second conveyor, and the speed of the servo conveyor is adjusted so that the packaged article arrives at the feeder simultaneously with the bucket. Once at the feeder, the servo conveyor ends and the momentum of the packaged article carries it forward off the servo conveyor and into the fan feeder. The forward momentum of the packaged article is stopped by the fan feeder, and the packaged article is then guided into a bucket and conveyed to a cartoner.

DETAILED DESCRIPTION

General Overview

Figure 2:
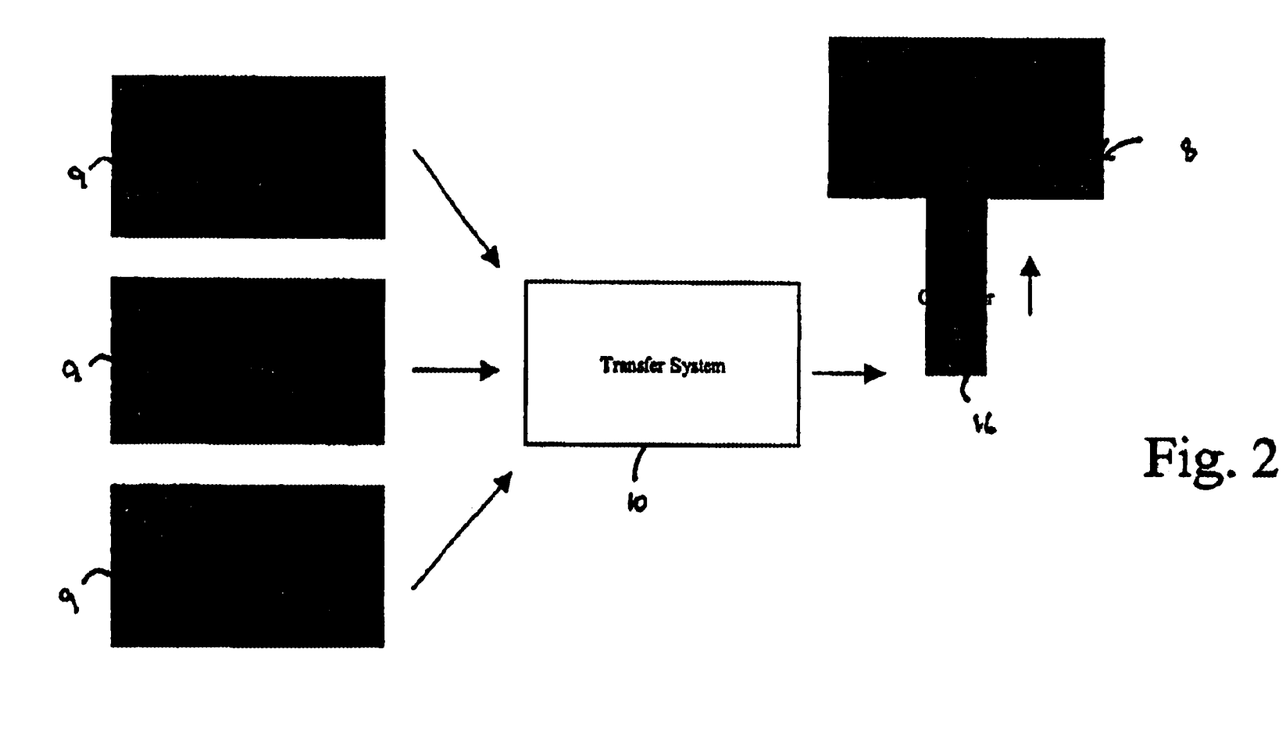
FIG. 2 is a flow diagram of one embodiment of a conveyance system.

As shown in FIG. 2, the subject invention is a high speed transfer system 10 capable of transferring items between two nonsynchronized elements in a conveyor system. The unique combination of elements in the subject transfer system 10 obviate the need for synchronizing or coupling the two elements, allowing each element to run generally independent of the other.

In operation, the subject transfer system is able to rapidly receive packaged articles from one or more bagger systems 9 and place each one into individual buckets 20 on a bucket conveyor 16. From there, each packaged article is transported to a cartoner where it is placed within a carton and sealed. All of this is accomplished without the need to have the bagger systems and the cartoner system 8 work in synchronization.

For the purposes of explanation only, the subject invention is disclosed and described in relation to a configuration that is particularly adapted for transferring packaged articles, such as cereal, in a vertical feed operation. In this environment, baggers receive loose articles and drop them vertically into a bag. Once the loose article is received, the bagger then seals the bag and transports it to the transfer system which then feeds a bucket conveyor in a cartoner ssytem. The packaged article is then transported by the bucket conveyor to the cartoner where it is then placed in a carton.

Even though the subject invention is particularly suited for use in a vertical feed operation, it is easily adaptable to be used in a number of different conveyance applications. As such, it would be obvious to those skilled in the art to adapt the subject invention for a similar use not described herein.

As shown in FIGS. 2, 3a, 3b, and 4a one embodiment of the transfer system 10 is generally comprised of an air conveyor 11, a servo conveyor 12, and a fan feeder 13. In a typical configuration, the air conveyor 11 is located at a first location where it receives packaged articles from a bagger system 9 or a conveyor system 18. The servo conveyor 12 abuts the air conveyor 11 opposite the bagger system 9 and extends to a second location adjacent to a bucket conveyor 16. The fan feeder 13 is located adjacent to the servo conveyor 12 at an end opposite the air conveyor 11. The fan feeder 13 lies above a bucket conveyor 16.

A packaged article is first received by the air conveyor 11 where it accumulates until transferred to the servo conveyor 12. As a bucket 20 approaches the fan feeder, the speed of the servo conveyor is adjusted automatically by a controller 26 so that a packaged article will be available to the fan feeder for placement within the bucket 20. The packaged article is transported by the servo conveyor 12 at a speed that will cause it to arrive at the fan feeder simultaneously with the bucket.

Once at the feeder, the momentum of the packaged article carries it off the servo conveyor and into the fan feeder. The forward momentum of the packaged article is stopped by the fan feeder and the packaged article is then guided into a bucket and conveyed to a cartoner.

Air Conveyor

Figure 3A:
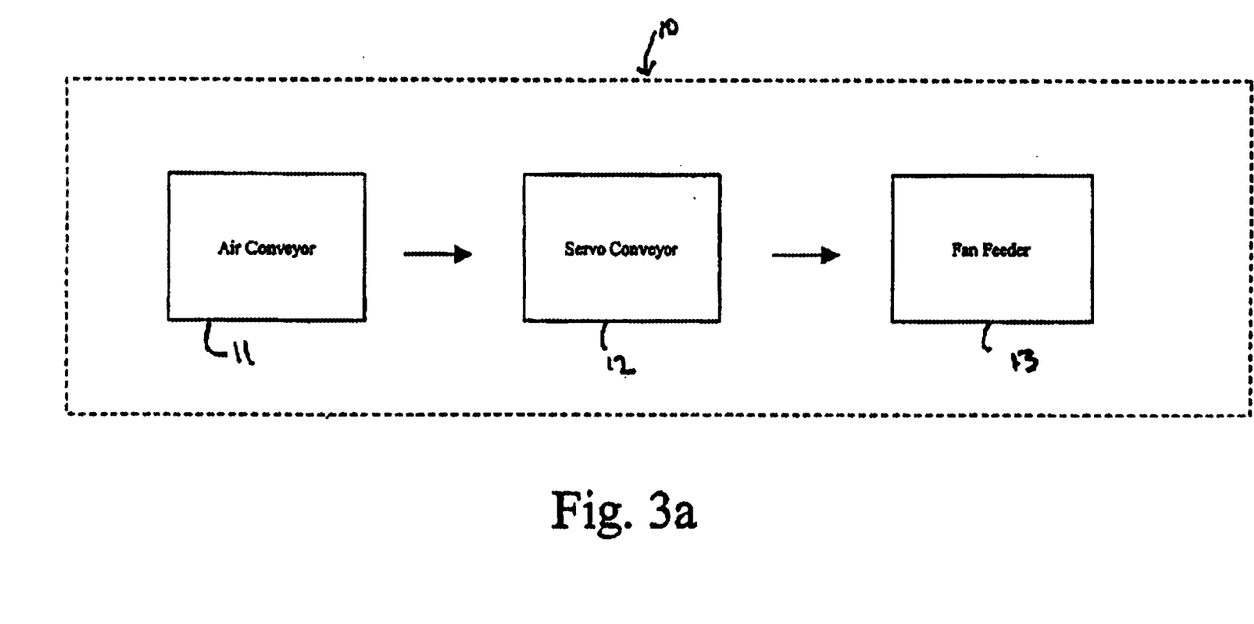
FIG. 3a is a flow diagram displaying the subject transfer system.
Figure 3B:
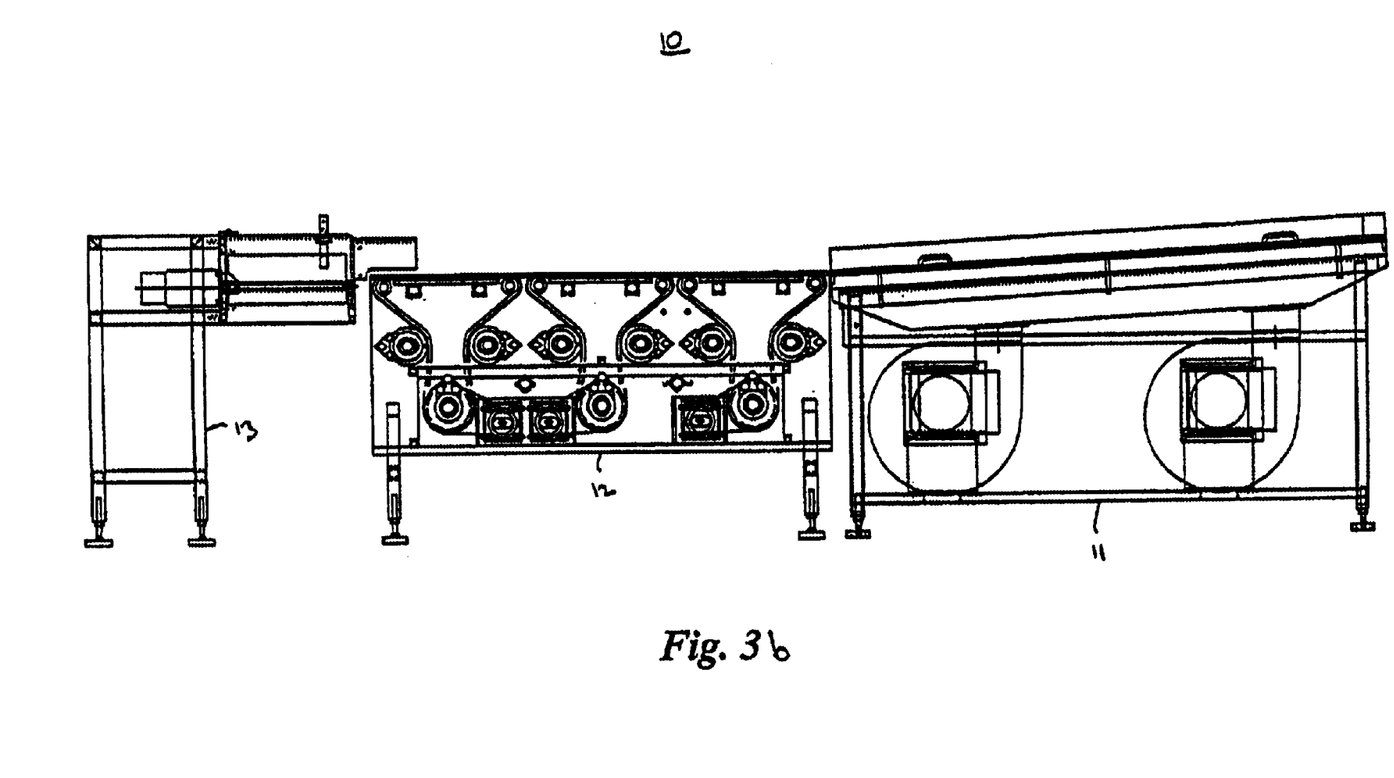
FIG. 3b is a front view of an embodiment of the subject transfer system.

As shown in FIGS. 3a, 3b, and 4, in one embodiment, the air conveyor 11 abuts a bagger system 9 and receives packaged articles therefrom. Preferably, each individual bagger deposits packaged articles directly onto a separate conveyor 18 that then delivers the packaged articles to the air conveyor 11. However, the air conveyor 11 may also be adapted to receive packaged articles directly from each individual bagger. The air conveyor 11 then transports the packaged articles to a location adjacent to the servo conveyor 12 and holds them until the servo conveyor 12 is prepared to receive it.

A plurality of air conveyors 11 may be utilized to define a pathway between the conveyor system 18 and the servo conveyor 12. This eliminates the need to elongate the bucket conveyor so that it is adjacent to the baggers. Typically, the air conveyor will span territory at a significantly lower cost than an elongated bucket conveyor. Also, due to the reduction of moving parts, a shorter bucket conveyor is typically more reliable than an elongated one.

Figure 5:
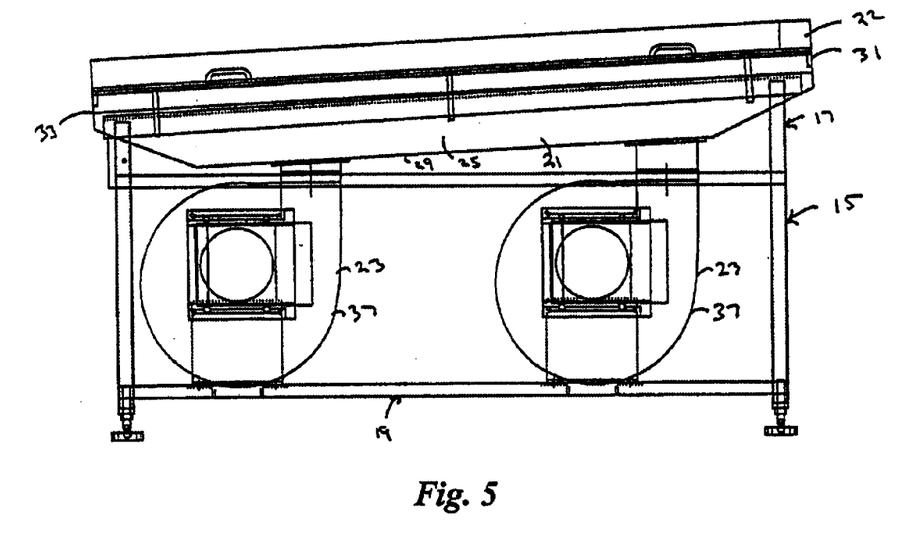
FIG. 5 is an enlarge front view of a air conveyor from the system of FIG. 3.
Figure 6:
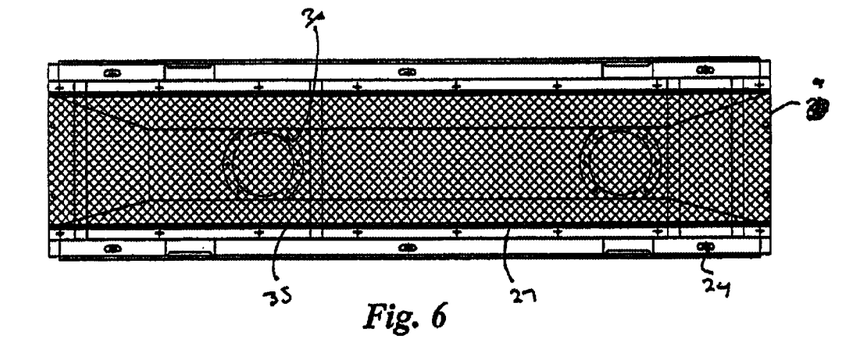
FIG. 6 is an enlarged overhead view of the air conveyor from the system of FIG. 3.

FIGS. 5 and 6 show an air conveyor. As shown in FIGS. 5 and 6, in one embodiment, the air conveyor includes a frame 15 having longitudinal upper 17 and lower 19 portions. The upper portion 17 supports a plenum 21 which is disposed longitudinally across the upper portion 17. The lower portion 19 supports an air source 23 which communicates with the plenum 21. A pair of guard rails 22 extend along opposite longitudinal sides of the plenum 21. The guard rails support a number of optical sensors 24 used to track movement of packaged articles.

The plenum 21 includes a plurality of walls 25 arranged to define longitudinally extending open 27 and closed 29 ends. It is angularly disposed along the upper portion 17 of the frame 15 and defines upper 31 and lower 33 sides. The open end 27 has a grated cover 35 which extends longitudinally across the open end 27. The openings in the cover 35 allow air from the plenum 21 to pass through the cover. The closed end 29 includes at least one opening 30 adapted to interface with an air source 23.

The air source 23 provides an airflow across the grated cover 35 which totally or partially lifts the packaged articles from the grated cover 35. In combination, gravitational force created by the angle of the plenum 21 and the lift provided by the air flow across the grated cover 35 enable a packaged article to slide, in a relatively friction-free manner, longitudinally across the air conveyor. The relatively friction free movement on the air conveyor also serves to minimize any damage to the packaged article and it's contents. Furthermore, the lack of a drive mechanism enable bags of cereal to accumulate in a generally linear fashion at the lower side 33 of the air conveyor 11 until taken by the servo conveyor 12.

In one embodiment, the air source 23 is comprised of two blowers 37 adapted to communicate with the plenum 21. The blowers 37 are supported by and mounted to the lower portion 19 of the frame 15. Alternatively, the air source 23 can also be independent of the frame 15 and may simply communicate with the plenum 21 through a plurality of pneumatic tubes.

Note that the amount of air being delivered by the air source can be adjusted to suit the article being transported. In general, the amount of air delivered through the plenum should be kept at a minimum.

The disclosed air conveyor design is given for the purpose of explanation and is not integral to the operation of the subject transfer system 10. There may be other air conveyor designs which are known in the art and which may be easily interchangeable with the disclosed embodiment.

Servo Conveyor

As shown in FIGS. 3a, 3b, and 4, in one embodiment, the servo conveyor 12 abuts the air conveyor 11 and receives packaged articles therefrom. The servo conveyor 12 works synchronously with the fan feeder 13 and the bucket conveyor 16 so that packaged articles are delivered at an interval which is compatible with the bucket conveyor 16. Synchronization is achieved through a controller 26 which monitors the position of a packaged article on the air conveyor 11 and the servo conveyor 12 relative to a bucket approaching the fan feeder 13. The controller 26 uses these input to determine an appropriate speed for the servo conveyor and when to activate the fan feeder.

Figure 7:
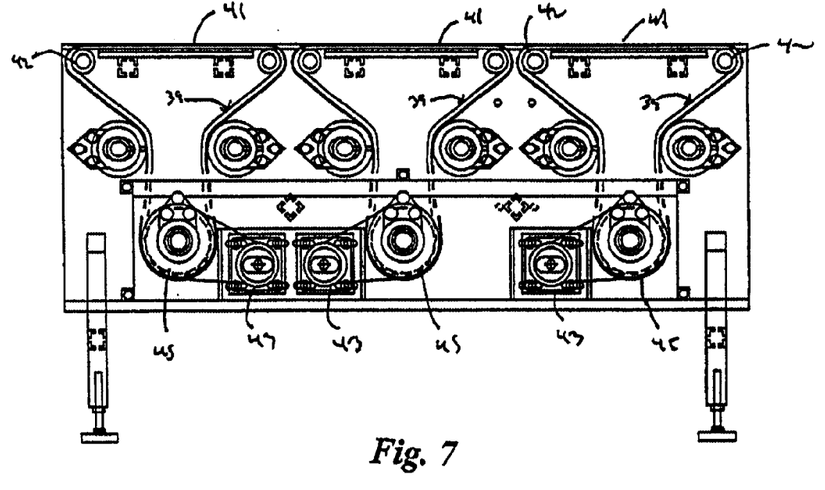
FIG. 7 is an enlarged front view of a servo conveyor from the system of FIG. 3.
Figure 8:
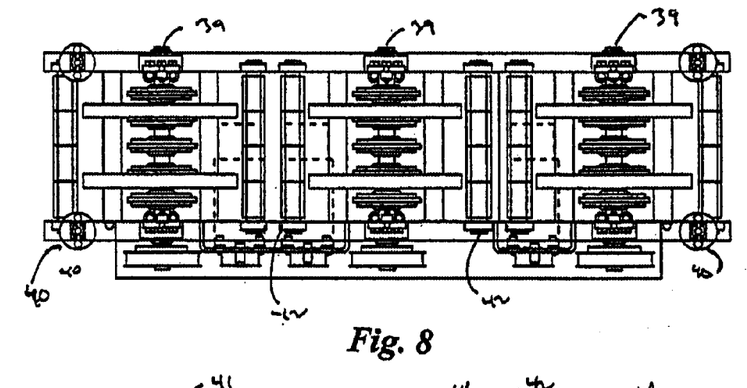
FIG. 8 is an enlarged overhead view of the servo conveyor from the system of FIG. 3 (with belt removed).

FIGS. 7 and 8 show one embodiment of a servo conveyor. As shown in FIGS. 7 and 8, in one embodiment, the servo conveyor 12 includes three separate conveyor mechanisms 39. Each of the conveyor mechanisms 39 work independent of the other, allowing all three conveyor mechanisms to operate at different speeds. Preferably, the conveyor mechanism 39 closest to the air conveyor 11 will operate at a slower speed than the other conveyor mechanisms 39, and the one adjacent to the fan feeder 13 will operate at the fastest rate. The progressive increase in speed between the conveyor mechanisms 39 separate the packaged articles so that generally only one packaged article is located on each conveyor mechanism. A number of optical detectors 40 are positioned along the servo conveyor 12 for detecting the position of a packaged article.

The conveyor mechanism 39 can be one that is known in the art. A typical conveyor mechanism will include a belt 41, a plurality of rollers 42 to support and to apply tension to the belt 41, and a belt drive mechanism. In one embodiment, the belt drive mechanism includes a belt drive motor 43 coupled to a drive roller 45. Other belt drives known in the art and capable of generating the desired belt speeds can also be used.

Fan Feeder

Figure 4A:
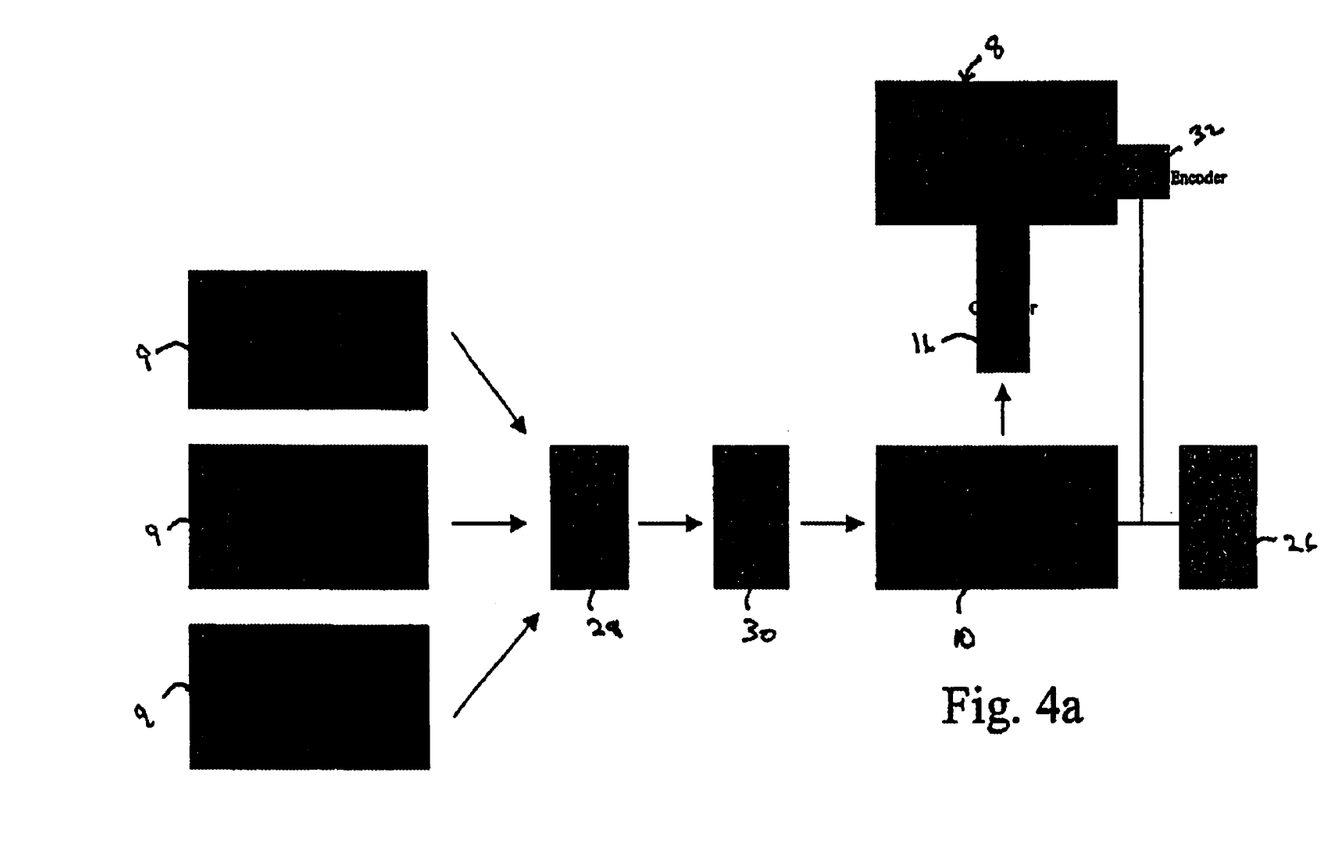
FIG. 4a is a flow diagram displaying the subject transfer system.
Figure 4B:
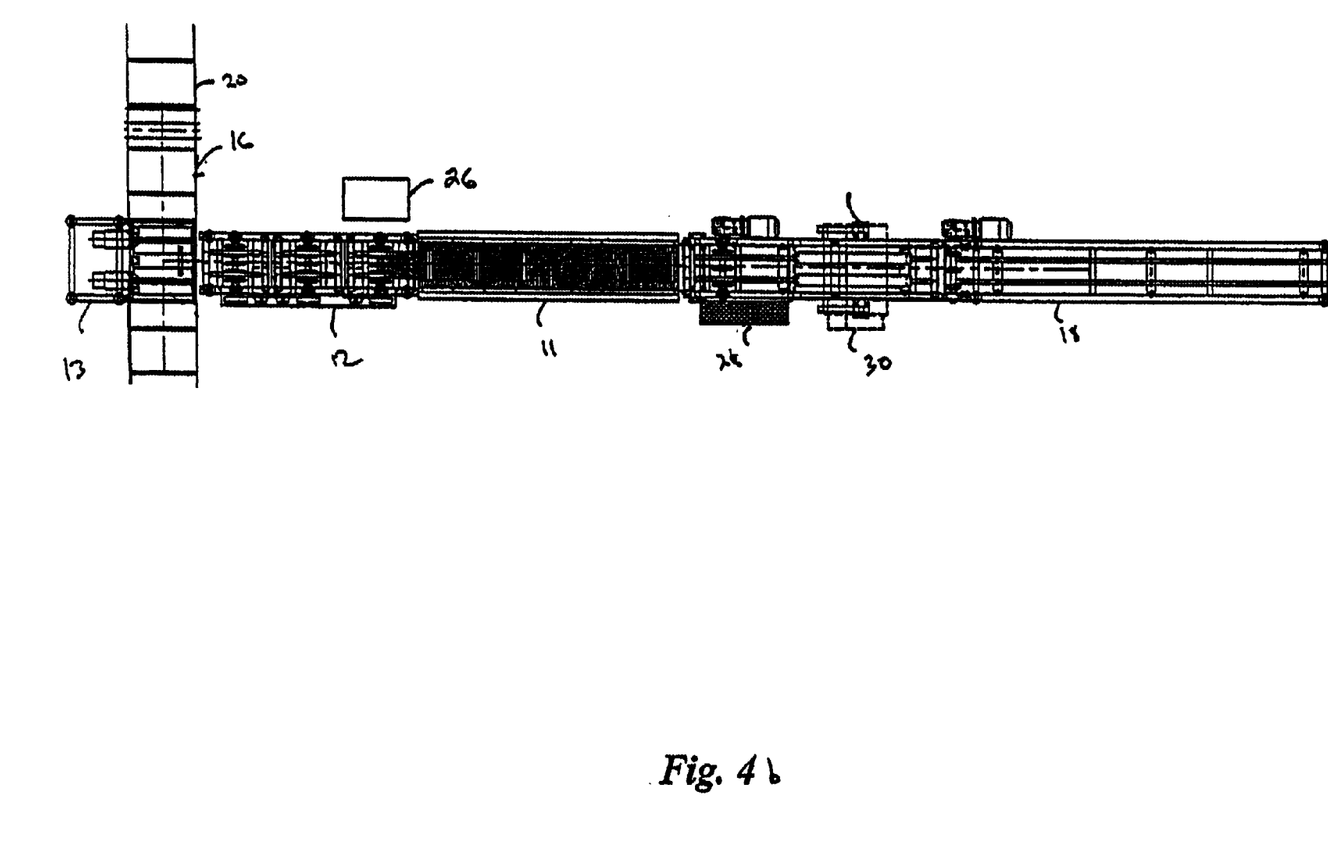
FIG. 4b is an overhead view of the system of FIG. 3 integrated with parts of a bagger system and a cartoner system.

As shown in FIGS. 3 and 4b, in one embodiment, the fan feeder 13 is located adjacent to the servo conveyor 12 at an end opposite the air conveyor 11. Typically, a bucket conveyor 16 for the cartoner system 8 will run underneath the fan feeder to receive a packaged article falling there through. Like the servo conveyor 12, the fan feeder 13 is synchronized with the bucket conveyor through a controller 26.

Figure 9:
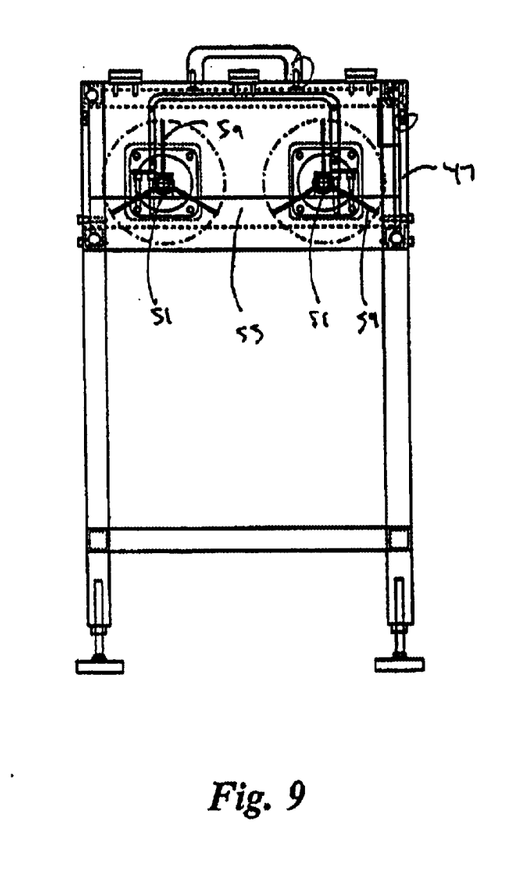
FIG. 9 is an enlarged front view of a fan feeder from the system of FIG. 3.
Figure 10:
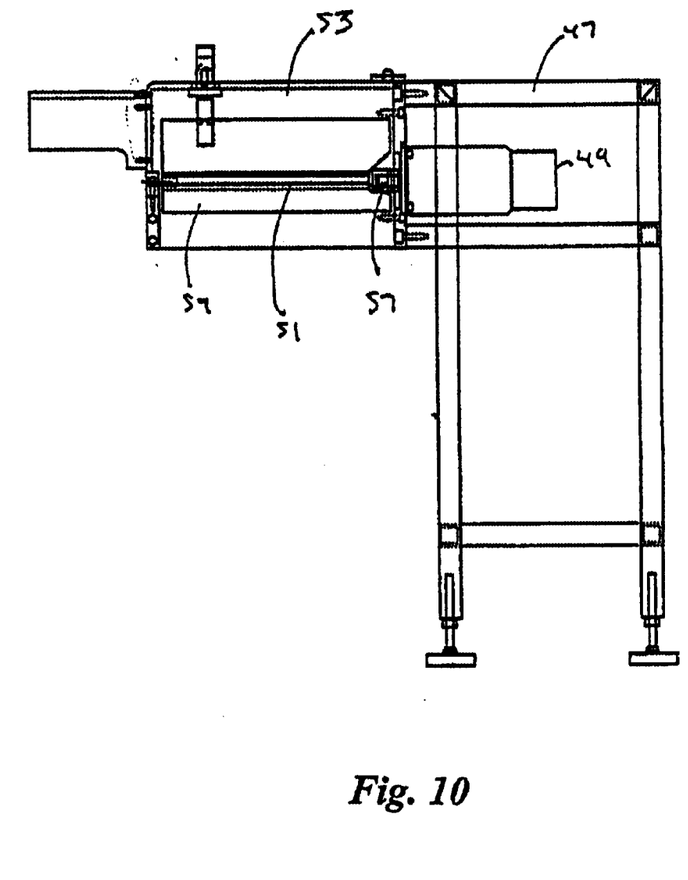
FIG. 10 is an enlarged side view of the fan feeder from the system of FIG. 3.

FIGS. 9 and 10 show one embodiment of a fan feeder. As shown in FIGS. 9 and 10, the fan feeder 13 includes a housing 47, a pair of motors 49 disposed within the housing 47, and a rotor 51 coupled to each motor. The housing 47 defines a stopping surface 55 that ends the forward motion of packaged articles coming from the servo conveyor 12. Each motor 49 has an arm 57 which extends through the housing 47 at a position adjacent to the stopping surface 55. Each arm 57 is coupled to a rotor 51.

The rotor 51 has a plurality of blades 59 which extend outwardly over the bucket conveyor 20. The blades 59 from each rotor 51 cooperate to guide the packaged article onto the stopping surface 55 and prevent it from immediately falling. Each blade 59 also cooperate with the other to support, orientate and guide the packaged articles into a bucket 20 lying there below.

The rotational speed of each rotor 51 can be varied depending on the application, but preferably both rotors rotate at only one speed. Rotation of the rotor is initiated and stopped by the controller to coincide with the arrival of a bucket. When opposing blades 59 on each rotor rotate to a position wherein both are generally adjacent to each other, a packaged article is prevented from falling into the bucket conveyor. As the blades 59 rotate further apart, the packaged article is allowed to fall gently into a bucket 20.

Controller

As shown in FIG. 4b, in one embodiment, a controller 26 is used to synchronize the movements of the subject transfer system 10. The controller's 26 primary purpose is to coordinate the placement of a packaged article into each bucket 20 on the bucket conveyor 16. To accomplish this task, the controller uses inputs received from optical sensors 24, 40, located on the air conveyor and the servo conveyor, data programmed into the controller, and inputs from an encoder 26 in communication with the cartoner system.

The encoder 32 provides the controller an exact position of a particular bucket. An encoder typically monitors the rotation of a drive shaft or a gear wheel on the bucket converor in order to determine the position of a bucket. There are a number of encoders known in the art which may be used interchangeably with the subject invention. Many will use an optical sensing means to determine rotation of a drive shaft or gear wheel.

The optical sensors 24, 40 determine the position of a packaged article with respect to the feeder, and the encoder 32 determines the position of a bucket on the bucket conveyor. With this information, the controller is able to adjust the speeds for each conveyor mechanism 39 to ensure that the packaged article will arrive at the fan feeder simultaneously with the bucket.

The controller 26 also includes software to calculate the position of the packaged article, to control and adjust the servo conveyor, and to control the fan feeder. This software is typically dependent on the servo conveyor 12, the fan feeder 13, and on the application, and such software can be generally created by one skilled in the art without any undue experimentation. There are also a number of software programs known in the art that are adaptable to perform the requisite calculations and which can control the servo conveyor and the fan feeder. One such software package is included with the Delta Systems Flow Feeding System™.

Operation

The subject transfer system 10 is able to receive packaged articles from the bagger system 9 in a nonsynchronized manner and place them within individual buckets 20 of a bucket conveyor 16 for a cartoner system. In so doing, the transfer system 10, enables the bagger system 9 to operate independently of the cartoner system.

As shown in FIG. 4b, in one embodiment, the air conveyor 11 abuts a conveyor 18 from a bagger system 9 and receives packaged articles therefrom. The air conveyor 11 then transports the packaged articles to the servo conveyor 12 and holds them until the servo conveyor 12 is prepared to receive it.

If the cartoner goes offline, the bagger systems 9 can continue to produce more packaged articles and allow them to accumulate on the air conveyor 12. In one embodiment, optical sensors 24 located on the air conveyor can also communicate with the bagger system to monitor the number of packaged articles accumulated on the air conveyor. When the number of packaged articles reaches a certain number, all of the bagger systems 9 shut down automatically. Once the cartoner is reactivated, the number of accumulated packaged articles are reduced, and the bagger systems 9 are then reactivated automatically.

If any of the bagger systems 9 go offline, the other bagger systems 9 are unaffected and will still be capable of sending packaged articles to the cartoner system. Consequently, individual bagger systems 9 can be removed for maintenance, replacement or for refilling without having to stop the entire system.

The servo conveyor 12 abuts the air conveyor 11 and receives a packaged article therefrom. The controller 26 utilizes optical sensors located on the air conveyor 11 and servo conveyor 12 to determine the position of a packaged article relative to a bucket in which it is to be placed. The controller 26 then adjusts the speed of the conveyor mechanisms 39 on the servo conveyor 12 so that the packaged article is delivered to the fan feeder 13 just as a bucket 20 passes beneath the fan feeder.

The fan feeder 13 is located adjacent to the servo conveyor 12 at an end opposite the air conveyor 11. As the servo conveyor 12 ends, the momentum of the packaged article propels it forward from the servo conveyor 12 onto the fan feeder 13. The packaged article is then caught by the blades 59 of each rotor 51. Using an encoder located on the cartoner system, the controller determines when to initiate rotation of the roller so that the packaged article is released when there is a bucket 20 directly below the fan feeder.

As shown in FIGS. 4a and 4b, an ancillary benefit of the subject transfer system 10 is the capability of checking for appropriate weight and for metal prior to reaching the cartoner system. Previously, these functions were performed after the faulty packaged article was placed in a carton (since removing a deficient packaged article would have caused an error to occur with the cartoner). Once a deficient packaged article was found, the entire package was thrown away. As a result, a carton was wasted with each deficient packaged article. However, in many instances, the cost of a carton was greater than the cost of the packaged article, and so there was a significant loss with each deficient packaged article.

Utilizing the subject invention, a faulty packaged article can be removed without affecting the cartoner system. Weighing scales 28 and metal detectors 30 can both be incorporated inline prior to the cartoner system. As such, if a packaged article fails a weight or metal test, it can be removed before being put in a carton. Depending on the number of faulty packaged articles produced, this ancillary benefit produces a significant savings.

Figure 11:
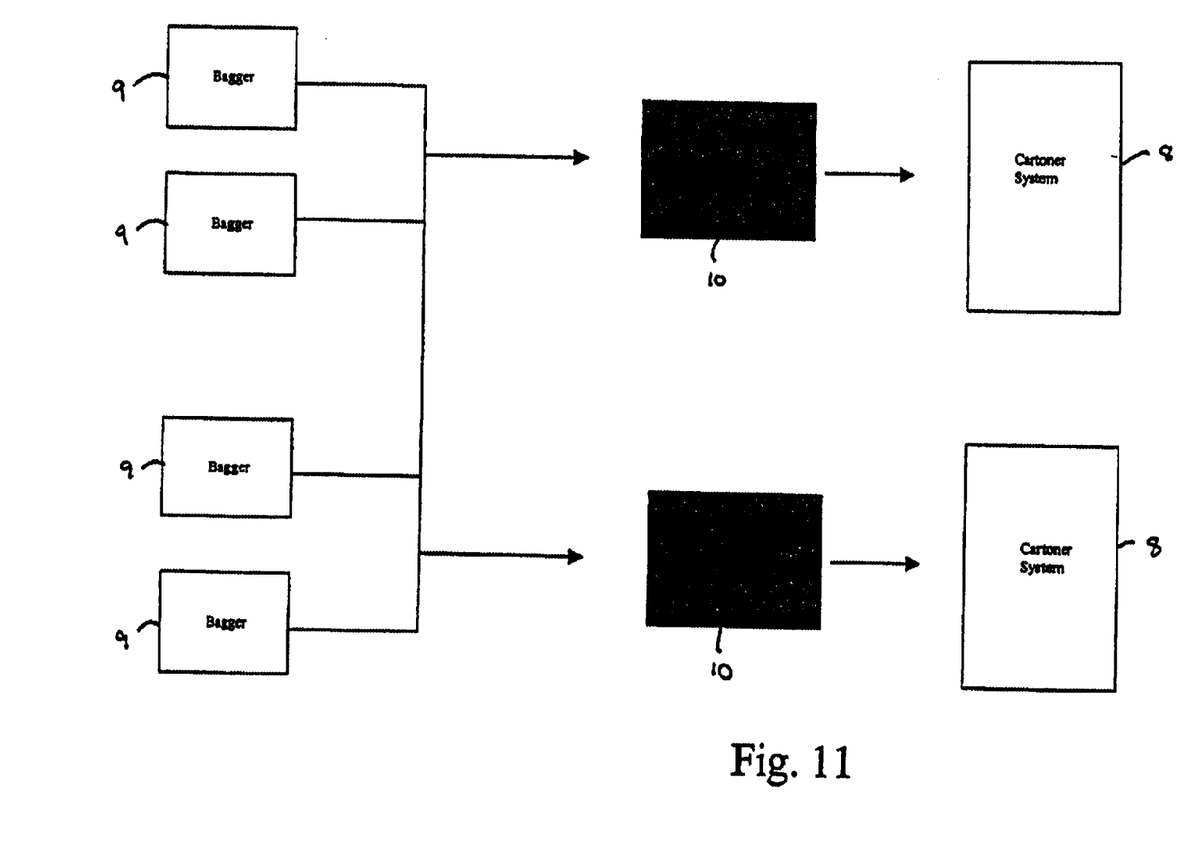
FIG. 11 is a flow diagram of an alternative configuration of the subject transfer system.

As shown in FIG. 11, another ancillary benefit to the subject invention is the general ease with which particular baggers may be switched to different cartoners, and vice versa. This is especially useful because a cartoner will typically work with only one size of carton. In order to add flexibility to a line, a number of transfer systems can be coupled to different cartoners, and the conveyor 18 can simply direct a flow of packaged articles into a transfer system for the intended cartoner. The conveyor 18 can also be configured so that it may selectively choose particular cartoners to receive packaged articles from.

While the present invention has been described with reference to several embodiments thereof, those skilled in the art will recognize various changes that may be made without departing from the spirit and the scope of the claimed invention. Accordingly, this invention is not limited to what is shown in the drawings and described in the specification, but only as indicated in the appended claims.

What is claimed is:

1. A method of transferring articles between conveyor systems comprising:

holding a first article on a first conveyor system monitoring movement of the first article on the first conveyor system;

monitoring movement of a first position on a second conveyor system;

providing a feeder at a feeding location to transfer the first article from the first conveyor system to the first position on the second conveyor system; and adjusting the speed of first conveyor system so that the first article arrives at the feeding location generally simultaneous to the first position.

2. The method of claim 1, and further comprising the additional step of determining the position of the first article relative to the feeding location.

3. The method of claim 2, and further comprising the additional step of determining the location of the first position relative to the feeding location.

4. The method of claim 3, and further comprising the additional step of calculating a speed adjustment to the first conveyor system so that the first article and first position reach the feeding position simultaneously.

5. The method of claim 1, wherein the first conveyor system includes an air conveyor and a servo conveyor.

6. The method of claim 5, wherein the feeder includes a rotor having at least one blade to receive an article.

7. The method of claim 6, wherein the second conveyor system includes a bucket conveyor, and wherein the first position is a bucket on the bucket conveyor.

8. The method of claim 7, wherein the step of adjusting the speed of first conveyor system includes the step of adjusting the speed of the servo conveyor.

* * * * *